Patented June 28, 1949

2,474,444

UNITED STATES PATENT OFFICE 2,474,444

PREPARATION OF ORGANOSILICON COMPOUNDS

Ambrose George Taylor, Birmingham, England, assignor to The Dow Corning Corporation, Midland, Mich.

No Drawing. Application July 25, 1947, Serial No. 763,753. In Great Britain February 12, 1946

Section 1, Public Law 690, August 8, 1946
Patent expires February 12, 1966

8 Claims. (Cl. 260—448.8)

This invention is for improvements in or relating to the preparation of organosilicon compounds.

It is known that organosilicon compounds can be prepared by the interaction of silicon halides with organic magnesium halides by a process involving the Grignard technique. It is also known that organosilicon compounds can be prepared by the interaction of organic halides with alkyl orthosilicates and metallic sodium.

According to the present invention there is provided a process for the production of alkyl-substituted silicon compounds which comprises reacting a silicon compound containing at least one alkoxy group directly attached to silicon, with a dialkyl sulphate and metallic sodium. The reaction may be carried out in the presence or in the absence of an inert solvent, as desired, and may be accelerated by the action of heat.

The silicon compounds which may be used in the process of this invention may have more than one alkoxy group directly attached to silicon, and in addition may have halogen, alkyl, cycloalkyl, aryl, alkaryl or aralkyl groups also attached directly to silicon. Polyalkoxy silanes are particularly suited to the process of the present invention, and as examples there may be mentioned tetramethyl orthosilicate, tetraethyl orthosilicate, dimethoxy dichlorsilane, trimethoxy chlorsilane, and phenyl trimethoxy silane.

The initial products of the reaction comprise an alkyl-substituted silicon compound together with sodium sulphate or sodium alkyl sulphate, and sodium alkoxide which would then react with further dialkyl sulphate. This side reaction may largely be avoided by including in the reagents or adding to the reaction mixture a silicon compound containing at least one halogen atom attached to silicon. On reaction with sodium alkoxide this compound will form sodium halide and regenerate an alkoxy-silicon compound. The regenerated alkoxy-silicon compound can then react with further dialkyl sulphate and sodium. As examples of the halogen-containing silicon compounds there may be mentioned silicon tetrachloride, silicon oxychloride, trimethoxy chlorsilane and methyl chlorsilane.

The alkyl-substituted silicon compounds produced by the process of this invention may be separated from the reaction mixture by distillation whereby the compounds are separated from the sodium compounds remaining in the reaction mixture. Alternatively, the silicon compounds may be filtered from the sodium compounds and in either case may be purified by fractionation.

The most useful products of the process of the present invention are those which may be used for the production of resinous bodies having well-known and valuable properties making them particularly suitable for use in electrical insulation. The compounds which may be used for the production of these resinous bodies and which can be obtained by the process of this invention are those having at least one alkyl group and at least two hydrolysable groups e. g., alkoxy or halogen groups, directly attached to silicon. Resinous bodies are produced from these compounds by a process comprising hydrolysis by reaction with an aqueous medium.

It appears that the mechanism of the reaction is the replacement of hydrolysable groups by hydroxyl groups followed by or simultaneously with a condensation reaction in which one molecule of water is eliminated from each pair of hydroxyl groups, whereby two silicon atoms become linked by an oxygen bridge.

It follows from this that when compounds containing three hydrolysable groups are subjected to the resinification process, three dimensional lattices will be formed, whereas if only compounds containing two hydrolysable groups are used, chain or ring lattices will be formed. It will be appreciated that compounds containing only one hydrolysable group will not yield lattices when subjected to the resinification process, but it is possible, and often desirable, to use a mixture containing some molecules having only one hydrolysable group since such molecules, when the mixture is hydrolysed, serve to terminate chain growth and thus afford a means of controlling the degree of molecular complexity of the resinification products.

A mixture of alkyl-substituted silicon compounds resulting from the process of this invention may of itself be subjected to the resinification process, or alternatively such a mixture may be separated into its constituents by fractionation or other means. These constituent compounds or suitable mixtures of them may also be used to prepare resinous bodies. These may be non-viscous liquids, oils, resins or rubber-like products according to the choice of compound or mixture used. Factors which control the properties of the products are the nature of the alkyl substituent or substituents and the proportions of compounds containing the various numbers of hydrolysable groups per molecule.

It is, therefore, in view of the foregoing, a feature of this invention to react a silicon compound having at least one alkoxy group and a total of at least three halogen and/or alkoxy groups per molecule directly attached to silicon, with a dialkyl sulphate and metallic sodium in amounts calculated to yield a silicon compound having an alkyl group and a total of at least two halogen and/or alkoxy groups per molecule directly attached to silicon, or to yield a mixture of silicon compounds in which at least the majority of molecules each have an alkyl group and a total of at least two halogen and/or alkoxy groups per molecule directly attached to silicon.

The following are examples of various ways in which the invention may be carried into effect:

*Example 1.*—23 gms. of metallic sodium were introduced into 250 ml. of toluene and 38 gms. of tetramethylorthosilicate were added. The mixture was heated under reflux until the sodium had melted. 76 gms. of diethyl sulphate were then added slowly with stirring, whereupon a vigorous reaction took place which was completed in 2 hours. The liquid phase was distilled away from the sodium salts and the ethyl methoxy silanes which were contained in the distillate were hydrolysed by warming the toluene solution thereof overnight with 200 ccs. of dilute aqueous hydrochloric acid. The toluene layer was separated off and the toluene removed therefrom by distillation. 18 gms. of a viscous liquid ethyl silicone were obtained.

*Example 2.*—23 gms. of metallic sodium were introduced into 250 ml. of toluene and 19 gms. of tetramethylorthosilicate were added. The mixture was heated under reflux until the sodium had melted. A mixture of 38 gms. of diethyl sulphate and 21 gms. of silicon tetrachloride was then added slowly, whereupon a vigorous reaction took place with the separation of sodium sulphate and sodium chloride. The liquid phase was distilled away from the sodium salts and the ethyl methoxy silanes which were contained in the distillate were hydrolysed by warming the toluene solution overnight with 200 ccs. of dilute aqueous hydrochloric acid. The toluene layer was separated off and the toluene removed therefrom by distillation. 16 gms. of a liquid ethyl silicone, containing 31.5% by weight of silicon, were obtained.

*Example 3.*—46 gms. of metallic sodium were introduced into 250 ccs. of tetrahydronaphthalene and 38 gms. of tetramethyl orthosilicate. The mixture was heated to 180° C. and a mixture of 63 gms. of dimethyl sulphate, 42 gms. of silicon tetrachloride and 250 ccs. of tetrahydronaphthalene was slowly added. A vigorous reaction occurred with the separation of sodium chloride and sodium sulphate. The methyl methoxy silanes which resulted from the reaction were separated by fractionation from the higher boiling solvent. 40 gms. were obtained containing 24.05% silicon, representing approximately a 70% yield.

I claim:

1. The method of preparing alkyl-substituted silicon compounds which comprises reacting molten metallic sodium with a tetraalkylorthosilicate and a dialkyl sulfate in liquid phase, whereby an alkyl radical from said sulfate is substituted for at least one alkoxy radical of said silicate.

2. The method of preparing alkyl-substituted silicon compounds which comprises reacting molten metallic sodium with a tetraalkylorthosilicate and a dialkyl sulfate in liquid phase, in mixture with a silicon tetrahalide, whereby an alkyl radical from said sulfate is substituted for at least one alkoxy radical of said silicate.

3. The method of preparing alkyl-substituted silicon compounds which comprises reacting molten metallic sodium with a tetraalkylorthosilicate and a dialkyl sulfate in liquid phase, in mixture with silicon tetrachloride, whereby an alkyl radical from said sulfate is substituted for at least one alkoxy radical of said silicate.

4. The method of preparing alkyl-substituted silicon compounds which comprises reacting molten metallic sodium, in a liquid aromatic hydrocarbon, boiling above the melting point of sodium, with a tetraalkylorthosilicate and a dialkyl sulfate in liquid phase, whereby an alkyl radical from said sulfate is substituted for at least one alkoxy radical of said silicate.

5. The method of preparing alkyl-substituted silicon compounds which comprises reacting molten metallic sodium with tetramethylorthosilicate and a dialkyl sulfate in liquid phase, whereby an alkyl radical from said sulfate is substituted for at least one methoxy radical of said silicate.

6. The method of preparing alkyl-substituted silicon compounds which comprises reacting molten metallic sodium with a tetraalkylorthosilicate and dimethyl sulfate in liquid phase, whereby a methyl radical from said sulfate is substituted for at least one alkoxy radical of said silicate.

7. The method of preparing alkyl-substituted silicon compounds which comprises reacting molten metallic sodium with a tetraalkylorthosilicate and diethyl sulfate in liquid phase, whereby an ethyl radical from said sulfate is substituted for at least one alkoxy radical of said silicate.

8. The method of preparing alkyl-substituted silicon compounds which comprises reacting molten metallic sodium in suspension in toluene, with a tetraalkylorthosilicate and dimethyl sulfate in liquid phase, whereby a methyl radical from said sulfate is substituted for at least one alkoxy radical of said silicate.

AMBROSE GEORGE TAYLOR.

REFERENCES CITED

The following references are of record in the file of this patent:

UNITED STATES PATENTS

| Number | Name | Date |
| --- | --- | --- |
| 2,238,669 | Wiley | Apr. 15, 1941 |
| 2,380,057 | McGregor | July 30, 1945 |
| 2,386,452 | Fleming | Oct. 9, 1945 |
| 2,386,793 | Hanford | Oct. 16, 1945 |
| 2,413,582 | Rust | Dec. 31, 1946 |

OTHER REFERENCES

Suter et al., "Jour. Amer. Chem. Soc.," vol 55 (1933), page 3496.